3,629,309
ORGANOSILICON COMPOUNDS AND PROCESSES FOR PRODUCING THE SAME

Donald L. Bailey, Sistersville, W. Va., and Victor B Jex, Scarsdale, N.Y., assignors to Union Carbide Corporation, New York, N.Y.
No Drawing. Continuation-in-part of application Ser. No. 615,492, Oct. 12, 1956. This application Nov. 13, 1969, Ser. No. 876,567
Int. Cl. C07b 7/08, 7/10; C07h 7/18
U.S. Cl. 260—448.2 B          12 Claims

ABSTRACT OF THE DISCLOSURE

Homopolymers of the formula

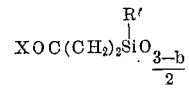

and copolymers containing the additional unit

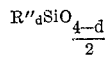

useful to combine with alkyl resins to make heat resistant coatings for glass cloth, aluminum and sheet steel, where X is Cl, ZHN, or MO; Z is R', NH$_2$ substituted monovalent hydrocarbon, or COOH substituted monovalent hydrocarbon; M is alkali metal, and R' is monovalent hydrocarbon radical, are disclosed.

CROSS-REFERENCE TO RELATED APPLICATIONS

This application is a continuation-in-part of Ser. No. 615,492 filed Oct. 12, 1956, now U.S. Pat. No. 3,493,533.

This invention relates in general to the synthesis of organosilicon compounds. More particularly, the invention contemplates the provision of new organosilane and organo-siloxane derivatives containing, among other possible functional groups, a carboxy or carboalkoxy functional group which is linked to the silicon atom or atoms through an aliphatic hydrocarbon substituent in a position removed from the silicon nucleus by at least two carbon atoms of the aliphatic linkage, i.e., beta-substituted or further along a silicon-bonded polymethylene chain. The invention further contemplates the provision of unique processes for producing compounds of the general class described as well as useful derivatives of such compounds.

Heretofore, organosilicon compounds containing silicon-substituted carboxylated radicals have been produced by reacting, in the presence of a peroxide catalyst, unsaturated aliphatic or cyclic monoesters and diesters with halogen-, hydrocarbon-, or halogenated hydrocarbon-substituted silanes containing at least one silanic hydrogen bond, to provide a carboxylated silane which is then hydrolyzed to produce a corresponding siloxane. While the foregoing technique has been applied largely in connection with the cyclic esters, it has been postulated by at least some investigators that the process is unsatisfactory when applied to aliphatic and cyclic unsaturated esters in which the unsaturated linkage is so positioned that a functional carbonyl group will be positioned less than three carbon atoms from the silicon nucleus following the ester-silane reaction, as would be the case, for example, when esters of acrylic acid are employed as starting materials. That is to say, it would appear from available literature reports that the process is inherently limited to the production of silanes and siloxanes in which the carboxy or carboalkoxy substituents are positioned no closer to the silicon atom than the gamma carbon atom of the silicon-bonded connecting chain or ring structure. Apart from the foregoing reported process limitations, the silane end-products of the ester-silane reaction as practiced heretofore in the production of organosilicon compounds containing carboxylated radicals are restricted to residual silicon functional groups consisting of hydrogen or halogen, or nonhydrolyzable residues such as methyl and phenyl substituents.

The present invention is based, in part, upon our discovery that silicon compounds containing a carboalkoxy group attached to the silicon atom through a polymethylene linkage may be produced by the acid-catalyzed alcoholysis of cyanoalkyl silicon compounds, whereby the cyano group (—CN) of the cyanoalkyl substituent is converted to the desired carboalkoxy substituent, as represented in general by the following equation:

(I) 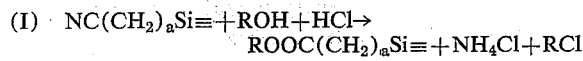

wherein R represents a monovalent hydrocarbon radical, including both alkyl and aryl radicals, and $a$ may be any number greater than one. Whereas any strong mineral acid may be employed as catalyst in the alcoholysis reactions of the invention, we prefer to employ hydrochloric acid as depicted within the foregoing equation because of its ease of removal as compared, for example, with sulfuric acid.

The basic reaction of the invention as illustrated above is equally applicable to the cyanoalkylsilanes, cyanoalkylalkoxysilanes and cyanoalkylsiloxanes. Thus, suitable cyanoalkyl monomeric and polymeric starting materials for use in the process of the invention may be represented in general by the following formulae:

(A) 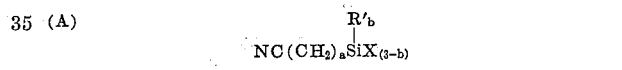

and (B) 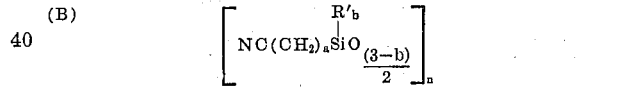

wherein R' represents any monovalent hydrocarbon radical, including both alkyl and aryl radicals; X represents halogen or alkoxy; $a$ any number greater than one; $b$ in Formula A has a value from 0 to 3 inclusive, and in Formula B a value from 0 to 2 inclusive; and $n$ in Formula B may be any whole number greater than one. Cyanoalkyl compounds of the general class defined above and process for their production have been described and claimed in copending U.S. application Ser. No. 555,201, filed jointly by Victor B. Jex and J. E. McMahon on Dec. 23, 1955, now U.S. Patent 3,257,440 and Ser. No. 555,203, now abandoned, filed jointly by Victor B. Jex and R. Y. Mixer, also on Dec. 23, 1955.

The process of the invention is particularly useful in the preparation of carboalkoxy-substituted compounds, and is unique in its application to the production of the carboalkoxyalkyldialkylalkoxy-, carboalkoxyalkylalkyldialkoxy- and carboalkoxyalkyltrialkoxysilane monomers as represented in general by the following formula:

(C) 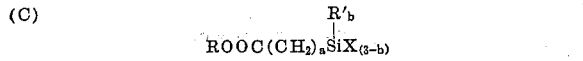

wherein R and R' represent monovalent hydrocarbon radicals; X represents alkoxy; $a$ is any number greater than one; and $b$ has a value from 0 to 2 inclusive.

The above-indicated compounds are prepared by esterification of the cyanoalkylchlorosilanes and subsequent acid-catalyzed alcoholysis of the cyano group as per Equation I above. The process is most convenient since the ester is formed initially and the hydrogen chloride evolved in its formation may be utilized in the subsequent alcoholysis reaction. In general, the combined reaction is effected by placing the particular cyanoalkylchlorosilane starting material within a suitable reaction vessel fitted with a stirrer, thermometer, reflux condenser and dropping funnel. Absolute alcohol is then added to the reaction vessel with stirring and the hydrogen chloride evolved by the reaction is passed from the vessel. When one, two or three equivalents of alcohol have been added, depending upon whether the starting material is a mono-, di-, or trichlorosilane, approximately a three molar excess of alcohol over that required for alcoholysis of the nitrile group is added, and the solution is heated to the reflux temperature. The solution is refluxed for several hours during which time ammonium chloride is formed. The mixture is then filtered, and the excess alcohol removed by a suitable vacuum evaporation technique. The resulting carboalkoxylylalkoxysilane is then distilled to yield the pure compound.

We have found that while theoretical quantities of alcohol and hydrogen chloride can be used in the process of the invention, it is generally best to employ a two or three molar excess of alcohol, and to maintain the solution substantially saturated with hydrogen chloride during the alcoholysis reaction. The reaction is conveniently conducted at the refluxing temperature of the alcohol employed, usually at temperatures within the range 50–110° C. for the more common aliphatic alcohols such as methanol, ethanol propanol, butanol, etc., but higher temperatures can be employed. Significantly, we have found that substantially increased yields can be obtained by conducting the alcoholysis reaction under pressure, and such a procedure is advisable or large scale commercial operations.

The monomeric alkoxy-substituted silanes as represented by Formula (C) above are readily hydrolyzed and condensed to the siloxanes, and, in the reaction, the carboalkoxy group may be preserved or hydrolyzed to a carboxy group. Thus, for example, the following equation represents a typical reaction for the production of a carboxy-substituted polysiloxane by hydrolysis of a trifunctional carboalkoxy silane in the presence of a strong acid (HCl), wherein H and $a$ have the meanings assigned above and $n$ is any number greater than one:

(II)

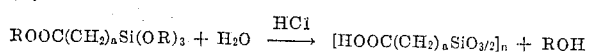

$$ROOC(CH_2)_aSi(OR)_3 + H_2O \xrightarrow{HCl} [HOOC(CH_2)_aSiO_{3/2}]_n + ROH$$

In the absence of mineral acid, the silane monomers may be hydrolyzed to produce cyclic siloxanes which retain the carboalkoxy organo functional group, as represented in general by the following equation illustrating the hydrolysis of a silicon difunctional carboalkoxy silane, wherein R, R' and $a$ have the meanings assigned above and $n$ is any number greater than two:

(III)

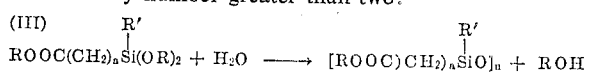

$$ROOC(CH_2)_aSi(OR)_2 + H_2O \longrightarrow [ROOC)CH_2)_aSiO]_n + ROH$$

Alternatively, we may effect the direct acid-catalyzed alcoholysis of a cyanoalkyl siloxane (Formula B above) with conversion of the cyano group to produce a coresponding carboalkoxy siloxane derivative of linear or cyclic structure depending on the starting material employed, as represented by the following equation, wherein R, R'$a$ and $n$ have the meanings previously assigned above:

(IV)

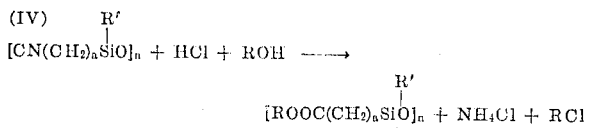

The carboalkoxy silicone products of the invention may be subjected, also, to transesterification to produce modified carbofunctional silicone esters. Thus, the carboalkoxy- alkylalkoxysilanes and carboalkoxyalkyl siloxanes obtained by the foregoing basic reactions may be transesterified in the presence of an acid catalyst to produce silicone esters of the types represented by the following formulae:

(D)

(E)

(F)

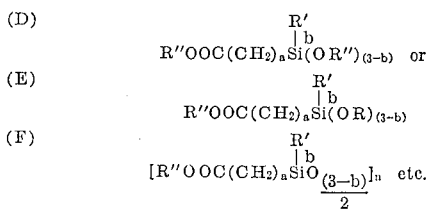

wherein R, R', $a$, $b$ and $n$ have the meanings previously assigned above, and R'' represents a monovalent hydrocarbon radical.

The alcohols used in the transesterification reaction may be any of the aliphatic primary, secondary or tertiary alcohols, or hydroxy-endblocked polypropylene or polyethylene oxide polymers, or, aromatic hydroxy compounds such as phenol may be employed. When carrying out the transesterification reactions, we prefer to employ anhydrous conditions inasmuch as the esterification is a reversible reaction. In the case of the carboalkoxyalkyl-alkoxy silanes anhydrous operations are necessary in order to prevent the formation of Si—O—Si bonds by hydrolysis. The ratio of the reactants is not critical in the reaction, and in fact, we have found that even with molar ratios of less than one alcohol group per alkoxy group, some transesterification takes place although the end-products under such conditions are usually mixed compounds. We have further found it to be possible, by use of controlled amounts of alcohol, to transesterify only the carboalkoxy group while retaining any siliconalkoxy bonds unchanged, as represented by the compounds of Formula E above. When complete transesterification is sought, it is desirable to use one mole of the alcoholic reagent for each alkoxy group in the molecule, and, if a relatively volatile alcohol is used, to employ a slight excess as in the case of the basic alcoholysis reaction described hereinbefore.

Any strong acid may be used to catalyze the transesterification reaction also, but we prefer to employ acids such as trifluoroacetic, perfluoroglutaric or any perfluoro organic acid or hydrogen chloride, since such acids are readily removable from the reaction system. The reaction may be effected at temperatures within the range 60–250° C. While we have employed temperatures within the range 60–200° C. for the reaction when a catalyst such as trifluoroacetic acid was used, temperatures within the range 200–250° C. have been employed with satisfactory results. While the transesterification reaction may be effected under pressure also, this practice merely serves to raise the reaction temperature. In actual practice, we prefer to operate at atmospheric pressure so that the more volatile alcohol may be removed, thereby driving the reaction to completion. Furthermore, while the reaction may be effected in solvents such as benzene, toluene, xylene, etc., with the advantage of raising and permitting control of the temperature at reflux and thereby facilitating the removal of the more volatile alcohol, we have found that the reaction may be controlled adequately in the absence of any solvent and prefer to operate in this manner.

In general, the carboalkoxyalkylalkoxysilane monomers of the invention will undergo all of the usual reactions of organic esters and alkoxysilanes to yield a variety of silicone products. The silanes are generally water-white liquids. The trifunctional silanes in particular are thermally stable on distillation at atmospheric pressure—little or no loss occurring due to cleavage or polymer formation. The silanes possess long shelf-life provided they are stored in a closed system, and are relatively light stable, in that, no darkening or polymer formation can be detected when the materials are stored in covered containers. The alkoxy groups attached to the silicon nucleus hydrolyze in the presence of moisture in a manner similar to conventional alkoxysilane derivatives. On treatment with excess water the compounds yield hydrolyzates by reaction of their silicon-bonded alkoxy groups which vary in composition from viscous, colorless oils to aqueous-alcoholic solutions of the corresponding polysiloxanes. These hydrolyzates may be concentrated to yield resins. The addition of small amounts of water to the compounds yield intermediate liquid hydrolysis products of varying compositions. The hydrolysis reactions can be controlled to effect complete or partial hydrolysis such that the resulting compounds will contain some residual alkoxy groups.

The silane ester monomers can be cohydrolyzed with other alkoxy silanes for the production of silicone oils, fluids and resins containing residual alkoxy groups, as represented in general by the following equations illustrating, on a unit basis, the cohydrolysis of a silicon-difunctional and silicon-trifunctional silane of the invention with other alkoxysilanes:

(V)

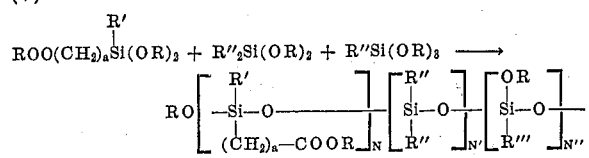

and (VI)

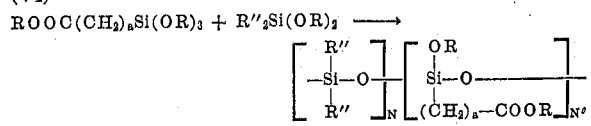

where R, R', R" and $a$ have the meanings assigned above, and R'" represents a monovalent hydrocarbon radical.

The siloxanes of this invention include those represented by the formula:

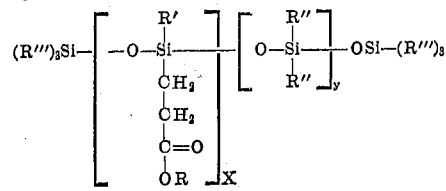

wherein R is a member selected from the group consisting of hydrogen and monovalent hydrocarbon radicals; R' and R" are members selected from the group consisting of monovalent hydrocarbon radicals; R'" is a member selected from the group consisting of alkoxy and monovalent hydrocarbon radicals; and $x$ and $y$ are whole numbers.

The polysiloxanes prepared from the silane monomers of the invention are extremely useful in the production of a variety of carboxy-and carboalkoxysiloxy-modified silicone and organic products. They may be copolymerized with other siloxanes of the general unit formulation:

(G) 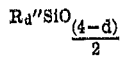

wherein $d$ has a value from 1 to 3 inclusive, and R" represents any monovalent hydrocarbon radical. The copolymerization can be effected in conventional manner as, for example, by cohydrolysis of the corresponding hydrolyzable silanes as illustrated above (Equations V and VI), or by catalytic copolymerization of the siloxanes, per se, in the presence of a siloxane bond-rearranging catalyst. A typical equilibration of the general class described is that represented by the production of carboalkoxypolymethylenealkylsiloxy - modified silicone oils from the hydrolyzates of carboalkoxypolymethylenealkyl-dialkoxysilanes, or the corresponding cyclopolysiloxanes, with other silicone cyclics and a suitable endblocker, in the presence of acid catalysts as, for example, the equilibration of gamma - carbethoxypropylmethylsiloxane cyclic tetramer, dodecamethylpentasiloxane, dimethylsiloxane cyclic tetramer and sulfuric acid, to yield the carbethoxy-modified dimethylsilicone oil represented by the equation:

(VII)

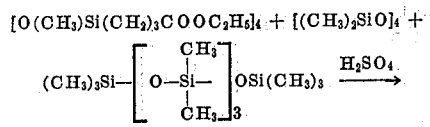

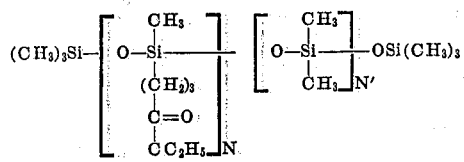

Of course, depending upon the ratio of reactants employed, one may obtain a variety of oils of varying molecular weights and percentages of carboalkoxy substituents, and oils containing phenyl, ethyl, vinyl and other groups may be prepared in a similar manner. Alternatively, in the absence of the endblocking polymer one may prepare a variety of silicone gum stock polymers.

The hydrolyzates of the carboalkoxyalkylalkoxysilane monomers of the invention may be readily converted into the corresponding acid salts by saponification with base as represented in general by the following equation illustrating the aqueous alkali saponification of a typical polysiloxane of the invention:

(VIII)

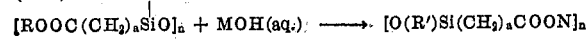

The acid salts thus produced are water soluble materials. The free acids are readily obtainable by neutralization of the salts with a strong acid, and the silicone acids prepared in this manner can be reacted with thionyl chloride, for example, to produce the corresponding acid chlorides which undergo reactions typical of organic acid chlorides.

Apart from the transesterification and saponification reactions illustrated above, the carboalkoxy groups of the silane monomers may be reacted with primary aliphatic or aromatic mono- or diamine, such as n-butylamine, propylene diamine and p-aminobenzoic acid, to yield amide derivatives, as represented in general by the following equation illustrating the reaction of a typical silane of the invention with a primary amine:

(IX)

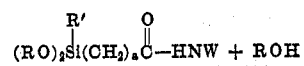

The novel monomeric and polymeric compounds produced by the processes of the invention have been employed in the production of a variety of carboxy- and carboalkoxyalkylsiloxy-modified silicones and organic derivatives of the types represented by the foregoing general equations, including among others, for example, silicone oils which are easily emulsified, oxidation resistant silicone-alkyd resins, ultra-violet absorbing aromatic amides, silicone elastomers, and esters of polyalkene glycols which are found to be good lubricants. Certain of these products are included within the examples which are presented hereinafter for purposes of illustrating the utility of the end-products of the present invention, but reference should be had, also, to out copending applications Ser. Nos. 615,468 now U.S. Pat. 2,957,899 and 615,499, now abandoned, both filed Oct. 12, 1956, wherein we have described and claimed other silicone products as well as certain of the linear and cyclic siloxanes which can be produced by application of the principles and techniques of the present invention.

Preferred silanes of this invention include silanes represented by the formula:

$$ROOC(CH_2)_aSiX_3 \qquad (i)$$

wherein R is a monovalent hydrocarbon radical; X is an alkoxy radical; and $a$ is an integer from 2 to 5. The silanes represented by Formula i include carboalkoxypolymethylenetrialkoxysilanes (e.g., gamma-carbethoxypropyltriethoxysilane) and silanes represented by the formula:

$$ROOC(CH_2)_2SiX_3 \qquad (ii)$$

wherein R is a monovalent hydrocarbon radical; and X is an alkoxy radical. Silanes represented by Formula ii include beta-carboalkoxyethyltrialkoxysilanes such as beta-carbethoxyethyltriethoxysilane.

Preferred siloxanes of this invention includes siloxanes comprising units of the formula:

$$BOC(CH_2)_2\underset{\underset{\displaystyle \frac{3-b}{2}}{|}}{Si}O \qquad (iii)$$

wherein B is Cl, WHN— or MO—; W is R', —NH$_2$ substituted hydrocarbon radical, or a —COOH substituted monovalent hydrocarbon radical; M is an alkali metal; R' is a monovalent hydrocarbon radical; and $b$ has a value from 0 to 1 inclusive.

The siloxane amides included within the scope of Formula iii above can be more specifically defined as siloxanes comprising units of the formula:

$$WHNOC(CH_2)_2\underset{\underset{\displaystyle \frac{3-b}{2}}{|}}{Si}O \qquad (iv)$$

wherein W is R', a —NH$_2$ substituted monovalent hydrocarbon radical, or a —COOH substituted hydrocarbon radical; R' is a monovalent hydrocarbon radical; and $b$ has a value from 0 to 1 inclusive.

The siloxane acid chlorides included within the scope of Formula iii above can be more specifically defined as siloxanes comprising units of the formula:

$$ClOC(CH_2)_2\underset{\underset{\displaystyle \frac{3-b}{2}}{|}}{Si}O \qquad (v)$$

wherein R' is a monovalent hydrocarbon radical; and $b$ has a value from 0 to 1 inclusive.

The siloxane salts included within the scope of Formula iii above can be more specifically defined as siloxanes comprising units having the formula:

$$MOOC(CH_2)_2\underset{\underset{\displaystyle \frac{3-b}{2}}{|}}{Si}O \qquad (iv)$$

wherein M is an alkali metal, R' is a monovalent hydrocarbon radical, and $b$ has a value from 0 to 1 inclusive.

One variety of the siloxanes comprising units represented by Formula iii above are siloxanes consisting essentially of such units and units represented by Formula G above.

The chemistry of certain of the basic processes of the invention as described hereinbefore, as well as the end-products derived thereby, are summarized graphically within the following reaction chart wherein silicon trifunctional compounds have depicted for purposes of illustration on a unit formula basis:

REACTION CHART

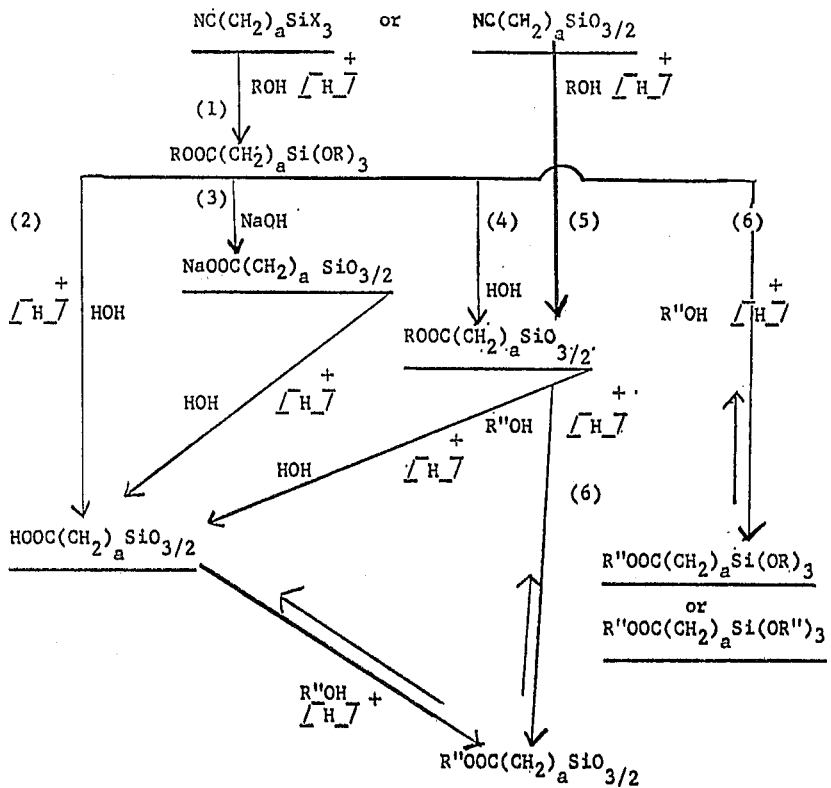

R and R" = monovalent hydrocarbon

X = halogen or alkoxy a = 2 or more and the other conventional organic diluents generally employed in the overbasing procedures of the prior art. Preferably, the diluent selected will be oil-soluble.

A preferred diluent will comprise mineral oil and at least one other diluent which is soluble in mineral oil but is less viscous than the mineral oil and, therefore, facilitates handling and filtering of the reaction mass. Suitable diluents for use in combination with mineral oil are those of the type mentioned above, that is, aliphatic, cycloaliphatic, and aromatic hydrocarbons and halogenated hydrocarbons. Specific examples include kerosene, xylene, toluene, ethylbenzene, n-propylbenzene, cumene, Stoddard solvent, fluorobenzene, chlorobenzene, bromobenzene, o-fluorotoluene, heptane, octane, nonane, decane, 2,2,4-trimethylpentane, cyclohexane, cycloheptane, cyclooctane, ethylcyclohexane, and the like. For best results, it is desirable that this less viscous diluent comprise about 30% to about 50% by weight of the total weight of starting materials used in the process, particularly in preparing products having metal ratios in excess of five. The less viscous diluents facilitate filtration and for some reason, improve oil-solubility of the final basic magnesium product. That is, the tendency for solids to precipitate during long-term storage is reduced or eliminated. Furthermore, in the absence of these less viscous diluents, there is a tendency in some instances, particularly in preparing products of higher metal ratios (e.g., metal ratios in excess of five) for an unfilterable gel-like mass to form. While such gels can be used as basic magnesium components in greases or as anti-rust, anti-corrosion protective coatings (usually 0.5 to 10 mil thickness) on ferrous metal surfaces exposed to air, moisture, and/or acidic vapors, they are not ordinarily suitable as fuel and lubricating oil additives.

In one aspect of this invention, it is preferred that the less viscous diluent used in combination with mineral oil will have a boiling point higher than 75° C. and preferably higher than 90° C. This is in the processes using an alcohol-water promoter where carbonation is conducted first in the presence of alcohol and water and then in the presence of water. For best results, it has been determined that carbonation in the presence of water alone should be at a temperature of at least about 75° C. and preferably at least about 90° C. Since it is convenient to conduct carbonation at the reflux temperature, diluents having boiling points of at least about 75° C. at standard pressure are preferred. For this reason, xylene is a particularly preferred diluent since it forms an azeotrope with water boiling at 90°-95° C. It offers the additional advantage of assisting in the removal of water upon completion of the process.

In its broadest aspect, the process of this invention involves mixing the components of the reaction mixture, that is, the acids or other suitable derivatives thereof as discussed above, active magnesium oxide, water, and diluent and introducing into this reaction mixture at least one inorganic acidic material. The temperature at which the acidic material is contacted with the remaining components of the reaction mass is not critical. Thus, the minimum temperature is that temperature at which the reaction mixture remains fluid, that is, does not begin to solidify. The maximum temperature is the decomposition temperature of the reaction component or product with the lowest decomposition point. Usually, the temperature will be in the range of about 25°-200° C. and preferably about 50°-150° C. The acidic material is conveniently contacted with the components of the reaction mixture at the reflux temperature. The reflux temperature obviously depends upon that material having the lowest boiling point. Accordingly, where methanol is used as a promoter in combination with water, the reaction mixture will be contacted with the acidic material at the reflux temperature of methanol. If water is the only promoter and the component of the reaction mixture having the lowest boiling point, the reflux temperature will be the boiling point of water or an azeotrope of water with, for example, xylene.

Generally, the acidic material is contacted with the components of the reaction mixture until there is no further reaction between the components of the reaction mixture and the acidic material that is, until reaction between the components of the reaction mixture and the acidic material substantially ceases. This can be determined in a number of ways conventional in the art. For example, if the acidic material is a gas which is being bubbled through the reaction mixture, then this "end point" is reached when the amount of gas being blown into the mixture substantially equals (that is, corresponds to about 90%-100%) the amount of gas leaving the reaction mixture. This is readily determined by the use of metered inlet and outlet valves for the gas. The end point can also be ascertained by periodic measurement of the pH of the reaction mixture. At the point at which the basicity becomes substantially constant, or the reaction mixture begins to become acidic, the "end point" has been reached. While it is preferable that the acidic material be contacted with the reaction mixture until there is no further reaction, useful basic magnesium salts can be prepared when the reaction mixture is contacted with the acidic material for a period of time sufficient for about 70% of the total acidic material to react relative to the amount which would react if the reaction were permitted to proceed to its "end point" as described above.

Upon completion of the reaction between the acidic material and the components of the reaction mixture, the solid components of the reaction product are usually removed by filtration, centrifugation or other convenient means. Thereafter, the reaction product is stripped, generally at reduced pressure, to remove alcohol, water, and, if desired, diluent having a boiling point less than mineral oil. Obviously, the reaction mixture can be stripped prior to removing solids if desired.

The foregoing procedure preferably is modified in the manner explained below if it is desired to prepare a basic magnesium salt having a metal ratio in excess of about 5 or 6. In this modified procedure, alcohol must be used as a co-promoter with the water. The reaction components are mixed together and this reaction mixture is then contacted with the acidic material in two stages. First, the components of the reaction mixture and the acidic material are contacted in the same manner as described above until the reaction between the inorganic acidic material and the reaction mixture substantially ceases. Thereafter, the temperature of the reaction mixture is raised to remove substantially all free alcohol promoter. It is preferable to continue contacting the acidic material with the reaction mixture during this period of time that the alcohol promoter is being removed although this is not essential. Any water that is removed during the removal of the alcohol is preferably replaced at this point. The reaction mixture with substantially all free alcohol removed is then contacted with the more acidic material, usually until the liquid phase of the reaction mass becomes substantially clear. Thereafter, the reaction mass is generally filtered, etc., to remove solids and the water is removed by heating, generally at reduced pressures. Again, if desired, any low boiling diluent can also be removed at this point. As mentioned hereinbefore, this two-stage procedure for contacting the reaction mixture with the acidic material results in products having little or no haze and which are more easily filtered. Moreover, basic magnesium salts having metal ratios in excess of about 5 have improved oil solubility when they are prepared by this two-stage process.

In some instances, the reaction mixture thickens when the alcohol promoter is removed. In those cases, it is preferable that the reaction mixture be contacted with the acidic material for a sufficient period of time for the mixture to again become "thinner" or less viscous. The reason for the thinning of the reaction material with the continued contacting with the acidic material is not understood, but this thinning effect is readily observable in the product. Generally, contacting the acidic material with the reaction product after removal of the alcohol promoter for a period of one to six hours, usually two to four hours, produces the desired clear, filterable product.

The foregoing modified procedure is useful in preparing basic magnesium salts having metal ratios of up to about 15 but generally not in excess of about 10 to 12.

When it is desired to prepare basic magnesium salts having unusually high metal ratios, that is, in excess of 15 the process should be conducted in a step-wise procedure. That is, a first basic magnesium salt should be prepared as described above and then this basic magnesium salt should be employed with additional magnesium oxide, promoter, and the like to increase the metal ratio. In this manner, the metal ratio of the basic magnesium salts can be increased to about 30 or more. Usually, when the metal ratio is being increased by conducting the overbasing process in a series of two or more steps, the metal ratio is usually increased in increments of about 5 to 15 and preferably in increments of about 8 to 12. Thus, if in the first step, a basic magnesium salt having a metal ratio of 10 is prepared and thereafter used as a starting material in a second step of the procedure, sufficient additional magnesium oxide will be added to provide a sufficient amount of magnesium to increase the metal ratio of the resulting product to about 15 to about 25. Obviously, the metal ratio can be increased by smaller units but this is inefficient. On the other hand, trying to increase the metal ratio by larger increments increases the tendency of the product to form a haze or to gel.

In these modified versions of the process of the present invention, that is, where the reaction mixture is contacted with the acidic material in two stages, it is essential for optimum results that the acidic material be contacted with the reaction components at a temperature of at least about 75° C. and preferably at a temperature of at least about 90° C. after removal of the alcohol promoter. As the free alcohol must be removed in these modified procedures, it is obvious why it is desirable that the alcohol promoter used in combination with water have a boiling point less than that of water. Otherwise, it is necessary to remove the water as well as the alcohol and then add water back to the mixture. Likewise, as explained above, the acidic material should be contacted with the remaining components of the reaction mixtures at temperatures of at least about 75° C. Accordingly, if any diluent of the mixture has a boiling point of less than this, it interferes with achieving this temperature. Increased pressure in such instances would permit elevation of the temperature but is easily avoided by selecting diluents having boiling points of at least 75° C. The maximum temperautre is limited only by the decomposition temperature of the reactants and product as explained above but usually will not exceed 200° C. Temperature of 90°–150° C. are preferred.

In a further modification of the process, it has been found useful to employ a combination of at least one oil-soluble aliphatic carboxylic acid and one other oil-soluble acid of the type described hereinabove to prepare basic magnesium salts. Thus, an organic acid mixture comprising at least one oil-soluble aliphatic carboxylic acid or other suitable derivative thereof as described above with at least one other organic acid susceptible to overbasing of the types described in detail hereinabove, e.g., on alkylated salicylic acid, a petrosulfonic acid, or an acid prepared from the condensation of phosphorus pentasulfide and polyisobutylene having a molecular weight of about 1000, is used according to this further modification as the "organic acid" to be overbased. Ordinarily, the aliphatic carboxylic acid per se or its alkali or alkaline earth metal salts inclding magnesium salts will be used. This modification can be used effectively with water and alcohol-water promoter systems. Generally, the aliphatic carboxylic acid or derivative thereof is employed in an amount such that there is one equivalent of the oil-soluble aliphatic carboxylic acid for each one to twenty, usually one to ten equivalents of the other organic acids present in the mixture, that is, an equivalent ratio of aliphatic carboxylic acid to other acid of about 1:1 to about 1:20 but generally 1:1 to about 1:10. The preferred ratio in the case of a combination of aliphatic carboxylic acids and sulfonic acids is an equivalent ratio of about 1:2 to about 1:5. The combination of acids results in a more efficient utilization of the magnesium oxide although the reason is not known.

It has also been determined that the presence of at least one oil-soluble sulfonic acid or suitable derivative thereof susceptible to overbasing, as described hereinbefore, is beneficial to the efficient utilization of magnesium and the preparation of products having higher metal ratios when preparing basic magnesium salts of at least one oil-soluble aromatic carboxylic acid or suitable derivatives thereof susceptible to overbasing such as those illustrated by Formulae I–III. This modification is very useful in preparing basic magnesium salts of hydroxy-substituted aromatic acids such as salicyclic acids. These hydroxy-substituted aromatic acids are exemplified by those included within Formulae II and III. This combination of acids can be used advantageously with water as the only promoter or in an alcohol-water promotor system as described above. The sulfonic acid may be an aliphatic, cycloaliphatic, or an aromatic sulfonic acid or mixtures of two or more such acids or derivatives thereof susceptible to overbasing, especially those sulfonic acids illustrated by Formulae IV–V. The amount of aromatic carboxylic acid and sulfonic acid, or their suitable derivatives, used in combination is such that the ratio of equivalents is about 1:1 to about 20:1, preferably about 2:1 to about 15:1.

A preferred process for overbasing a combination of hydroxy-substituted aromatic carboxylic acids as described in the preceding paragraph corresponds to that desired above for overbasing the combination of organic acids and aliphaict carboxylic acids discussed hereinbefore. This preferred process comprises preparing basic magnesium salts by carbonating a mixture comprising (a) M equivalents of at least one member selected from oil soluble hydroxy-substituted aromatic carboxylic acids or equivalent derivatives thereof susceptible to overbasing, (b) N equivalents of at least one member selected from oil-soluble sulfonic acids and equivalent derivatvies thereof susceptible to overbasing, (c) Q equivalents of basically reacting magnesium oxide where the ratio of $M:N$ is about 1:1 to about 20:1 and the value of $$\frac{Q}{M+N}$$

is from about 1.1 to about 30 or more, usually not more than 20, and preferably about 2 to about 12 (d) water and (e) a substantially inert organic liquid medium until the reaciton between the carbon dioxide and the mixture substantially ceases. The modifications, variations, and preferences in the magnesium overbasing processes described herein are also applicable to the overbasing of M and N. Thus, aliphatic alcohols such as methanol or mixtures of methanol and other lower alkanols can be used as co-promoters. However, these co-promoters ordinarily may be deleted without adverse results (e.g., haze, gel formation) when preparing basic magnesium salts from oil-soluble hydroxy aromatic acids or their derivatives susceptible to overbasing. Likewise, xylene is a preferred diluent, the metal ratio is usually increased in increments of 5 to 15, the acids per se or their alkali or alkaline earth metal salts or mixtures thereof are usually employed as starting materials and so forth. Further, the process can

Example VIII

Preparation of gamma-carbethoxypropylmethylsiloxane cyclic trimer, gamma-carbethoxypropylmethylsiloxane cyclic tetramer, and gamma-carbethoxypropylmethylsiloxane cyclic pentamer by acid alcoholysis of gamma-cyanopropylmethylsiloxane cyclic tetramer:

(CHART REACTION 5)

Gamma-cyanopropylmethylsiloxane cyclic tetramer, in amount 470 grams, was dissolved in absolute ethanol (552 grams) within a three-liter, three-necked flask fitted with a stirrer, gas inlet tube and reflux condenser. The solution was then stirred, saturated with hydrogen chloride and heated to reflux (80° C.) for 16 hours during which time ammonium chloride precipitated. The ammonium chloride was filtered off, and the filtrate was again saturated with hydrogen chloride and refluxed an additional eight (8) hours, at which point it was again filtered to remove any ammonium chloride. The alcohol was then removed by vacuum evaporation and the residue was washed with dilute sodium bicarbonate. The siloxane was then dissolved in ether and toluene and washed with distilled water until neutral to pH paper. The solvents were then removed by vacuum evaporation. Infrared analysis of the material showed it to be high in linear gamma - carbethoxypropylmethylpolysiloxane but free of C=ONH$_2$, C=NH and C≡N bonds. The following procedure was adopted to increase the yield of cyclics.

The gamma - carbethoxypropylmethylsiloxane linears, in amount 350 grams, were dissolved in 500 cubic centimeters of toluene within a two-liter flask fitted with a reflux condenser, and concentrated sulfuric acid (4.0 grams) was added. The solution was then refluxed for five (5) hours, thereafter cooled to room temperature, and the sulfuric acid neutralized with a dilute solution of sodium bicarbonate. The solution was then washed with distilled water until the water washings were neutral to pH paper. The solvent was then removed by vacuum evaporation and the residue was distilled in a "Hickman" molecular still to yield cuts of the cyclic trimer, tetramer and pentamer. The total yield of distillables was 88 percent of theoretical based on starting material.

Since the "Hickman" still was relatively small, the distillation was divided into parts. One such distillation gave trimer, tetramer and pentamer in the following amounts, the structures of which were confirmed by infrared analysis:

|         | Percent |
|---------|---------|
| Trimer  | 31.3    |
| Tetramer | 53.2   |
| Pentamer | 5.2    |
| Distillable | 89.7 |

The following refractive indices and boiling points were obtained for the materials and the analytic data for the tetramer and pentamer compared favorably with those given in Example V: Gamma-carbethoxypropylmethylcyclopolysiloxanes—

|  | 25° C., $n_D$ | B.P.° C., 50 microns Hg |
|---|---|---|
| Cyclic trimer* | 1.4431–58 | 215 |
| Cyclic tetramer | 1.4482–8 | 240–280 |
| Cyclic pentamer | 1.4497 | 300–340 |

*Molecular weight: Found, 543, calculated, 522.

In an analogous manner, the beta-carbethoxyethylmethylsiloxane cyclics can be prepared from beta-cyanoethylmethylsiloxane cyclic tetramer. The following analytical and physical data were obtained for the pure tetramer:

[EtOOC(CH$_2$)$_2$SiMeO]$_4$
Boiling point: 205–210° C. (0.08 mm.)

Refractive index ($n_D^{25° C.}$)—1.4376
Molecular weight: Cal. 640. Found 621
Saponification No.: Theoretical 350. Found 365
Si(C$_6$H$_{12}$SiO$_3$): Cal. 17.5%. Found 19.1%.

Both the trimer and pentamer were also identified by infrared analysis of a higher boiling point fraction obtained by distillation.

TRANSESTERIFICATION REACTIONS

Example IX

Reaction of 2-ethylbutanol with gamma-carbethoxypropylmethyldiethoxysilane in a 1:1 molar ratio to produce gamma-carbo-2-ethylbutoxypropylmethyldiethoxysilane:

(CHART REACTION 6)

Gamma - carbethoxypropylmethyldiethoxysilane (0.1 mol), 2-ethylbutanol (0.1 mol) and trifluoroacetic acid (1.0 gram) were mixed in a 100 cubic centimeter round-bottom flask fitted with a reflux condenser, and heated therein. Ethanol began to reflux in the head almost immediately. The volatile material was taken off at the head and showed a refractive index very close to that of pure ethanol. After the ethanol was collected (5.75 cc.) the residue was then heated for one hour at 100° C. under vacuum (less than 1 mm.) to remove the remaining ethanol and any unreacted 2-ethylbutanol. The residue was then heated to 160° C. under vacuum to remove any unreacted gamma-carbethoxypropylmethyldiethoxysilane. The end-product was subjected to infrared analysis and found to contain both the ethoxy and carbo-2-ethylbutoxy groups.

Example X

Transesterification of gamma-carbethoxypropylmethyldiethoxysilane with 2-ethylbutanol in a 1:2 molar ratio to produce gamma-carbo-2-ethylbutoxypropylmethyldi-2-ethylbutoxysilane:

(CHART REACTION 6)

Gamma - carbethoxypropylmethyldiethoxysilane (0.1 mol) and 2-ethylbutanol (0.2 mol) were mixed in a 250 cubic centimeter round-bottomed flask fitted with a still head, and 1.0 gram of trifluoroacetic acid was added. The flask was then heated and refluxing started almost immediately. The volatiles were removed as formed. Fourteen (14) cubic centimeters of volatiles were collected ($n_D^{25° C.}$=1.3645). The residue was then stripped at 160° C. under vacuum to remove any unreacting starting silane. The residue thus obtained was subjected to infrared analysis and found to be substantially all gamma-carbo-2-ethylbutoxypropylmethyldi-2-ethylbutoxysilane.

Example XI

Transesterification of gamma-carbethoxypropylmethyldiethoxysilane with n-butanol in a 1:2 molar ratio to produce gamma-carbobutoxypropylmethyldibutoxysilane:

(CHART REACTION 6)

Gamma - carbethoxypropylmethyldiethoxysilane (0.1 mol) and n-butanol (0.2 mol) were charged into a 250 cubic centimeter round-bottomed flask fitted with a still head. Trifluoroacetic acid (1.0 gram) was added as catalyst, and the materials were thereafter heated to 100° C. for three days. Since a low yield had been obtained in a previous run it was thought that the trifluoroacetic acid might be too volatile, and, therefore, perfluoroglutaric acid (1.0 gram) was added and the heating continued for twenty-four more hours. The ethanol formed was distilled over at atmospheric pressure. On heating the pot to 300° C. at atmospheric pressure no further volatile material was isolated. The residue was then stripped under vacuum at 160° C. to remove unreacted starting material. Carbobutoxypropylmethyldibutoxysilane was identified by infrared analysis within the final residue.

Example XII

Transesterification of gamma-carbethoxypropylmethyldiethoxysilane with n-butanol in a 1:3 molar ratio to produce gamma-carbobutoxypropylmethyldibutoxysilane:

(CHART REACTION 6)

Gamma-carbethoxypropylmethyldiethoxysilane (0.1 mol) and n-butanol (0.3 mol) were mixed in a 250 cubic centimeter round-bottom flask and trifluoroacetic acid (1.0 gram) was added thereto. The flask was then fitted with a water-cooled still head and heated to 100° C. for 72 hours. Perfluoroglutaric acid was then added and the mixture was heated to reflux for twenty-four hours during which time the ethanol was distilled off. The reaction solution was then stripped under vacuum (less than 1 mm.) at 100° C. to remove the remaining ethanol and unreacted n-butanol. The reaction solution was then stripped at 160° C. under vacuum to remove the unreacted starting silane. The residue thus obtained was shown to be gamma-carbobutoxypropylmethyldibutoxysilane by infrared analysis.

Example XIII

Esterification of gamma-carboxypropylmethylsiloxane cyclic tetramer with "Ucon LB-40":

(CHART REACTION 6)

Gamma-carboxypropylmethylsiloxane cyclic tetramer, in amount 43.8 grams, "Ucon LB-40" (a Ucon of about 300 molecular weight containing a terminal OH group), in amount 108 grams (20% excess), 2.0 grams of trifluoroacetic acid, and 400 cubic centimeters of toluene were charged into a one-liter flask with a Dean Stark Moisture Trap and refluxed at 120° C. for 24 hours. At the end of this time, the trifluoroacetic acid was neutralized and the material stripped under vacuum. The residue weighed 81 grams representing a 66 percent yield. The compound had a viscosity of 28 centistokes at 25° C.

UTILITY REACTIONS

The following additional examples are offered for purposes of illustrating other reactions and select uses of typical compounds of the invention.

Example XIV

Preparation of Amide of Beta-Carbethoxyethyltriethoxysilane.—Beta-carbethoxyethyltriethoxysilane of Example I (0.2 mole) and p-aminobenzoic acid (0.2 mole) were heated in a flask fitted with a still head to 150° C. Ethanol began to reflux and the refluxing was continued for thirty-two (32) hours. The ethanol was then distilled off and the residue was vacuum stripped at 150–200° C. The resulting product was dissolved in chloroform, filtered and then stripped of chloroform to yield a viscous resin-like material. This material proved to be an excellent ultraviolet absorber in the 2600 to 3100 A. range. The percent transmission through a solution containing 0.041 gram per liter of the product in ethanol within a cell of one centimeter thickness is given below.

| Wavelength (A) | Percent transmission |
|---|---|
| 2600 | 16.5 |
| 2700 | 7.0 |
| 2800 | 4.0 |
| 2900 | 4.0 |
| 3000 | 5.5 |
| 3100 | 14.5 |

Example XV

Preparation of dimethylsilicone oil containing fifty percent by weight of gamma-carbethoxypropylmethylsiloxy units:

Octamethylcyclotetrasiloxane, in amount 84.6 grams, dodecamethylpentasiloxane, in amount 15.4 grams, and gamma-carbethoxypropylmethylsiloxane, in amount 100 grams, were mixed in a one-liter, round-bottomed, three-necked flask fitted with a stirrer and thermometer. The solution was heated to 80–90° C. on a steam bath and a 2 percent by weight concentrated sulfuric acid solution was added with stirring. The heating and stirring were continued for three (3) hours. The oil was then cooled to room temperature and sodium bicarbonate added to neutralize the sulfuric acid. The oil was then dissolved in diethyl ether and washed with distilled water until the water washings were neutral to pH paper. The ether was then evaporated off and 100 cubic centimeters of toluene added. The toluene and any water remaining were then stripped off under vacuum at 150° C. (three hours).

The resulting oil had a viscosity of 70.5 centistokes at 25° C.

Another oil containing five (5) percent by weight of gamma-carbethoxypropylmethylsiloxy units and having a viscosity of 79 centistokes at 25° C. was prepared from 5.0 grams of the gamma-carbethoxypropylmethylsiloxane cyclic tetramer of Example V, 87.3 grams of octamethylcyclotetrasiloxane and 7.7 grams of dodecamethylpentasiloxane.

Example XVI

Preparation of a silicone-modified alkyd resin:

This example describes the preparation of an ethoxy-endblocked silicone polymer consisting of $C_6H_5SiO_{3/2}$, $(C_6H_5)_2SiO$, $EtOOC(CH_2)_3SiO_{3/2}$, and

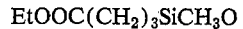

units, and the copolymerization of this silicone with an alkyd resin containing free OH groups by transesterification.

For convenience, the cyano rather than the carbethoxy containing siloxane was prepared first and the nitrile groups were then converted to carbethoxy by the alcoholysis technique of the invention.

The starting materials were:

| | Moles |
|---|---|
| Gamma-cyanopropyltrichlorosilane | 0.3 |
| phenyltrichlorosilane | 0.3 |
| Gamma-cyanopropylmethyldichlorosilane | 0.2 |
| diphenyldichlorosilane | 0.3 |
| ethanol | 0.24 |
| water | 1.175 |

The phenyltrichlorosilane and gamma-cyanopropyltrichlorosilane were charged to a one-liter, three-necked flask equipped with dropping funnel, stirrer, vacuum attachment and thermometer. The ethanol was added slowly with stirring and external cooling. The above difunctional monomers in 200 cubic centimeters of dry diethyl ether were then added followed by slow addition of the water. The contents were stirred for one hour. This completed the primary polymer-forming step. The next step was directed to alcoholysis of the nitrile groups and further condensation of the materials. Two hundred (200) cubic centimeters of dry ethanol were added and the ether stripped from the solution. The solution was then saturated with HCl and refluxed for six hours. A large quantity of ammonium chloride appeared as a precipitate during the reflux period. The solution was neutralized with sodium bicarbonate, filtered, diluted with 200 cubic centimeters of toluene, and finally stripped of both toluene and excess alcohol to yield a resinous product containing 90.8 percent solids. The product had a saponification number of 147 and contained 21.6 percent (OC$_2$H$_5$) as Si-OEt and COOEt units.

The above polymer was reacted with an alkyd resin prepared from the following materials:

2-ethylhexoic acid: 2.4 moles
Glycerine: 2.9 moles
Dimethyl tephthalate: 2.24 moles
Litharge, catalyst: 2 grams The alkyd had a saponification number of 447 and acid number of 7.2 and contained 5.1 percent OH groups.

The silicone resin (40 grams) and alkyd resin (360 grams), in Solvesso 150 solvent (360 grams), were heated in a distillation flask with stirring until gellation appeared imminent. Ethanol was formed and 4.5 grams collected, the theoretical for complete transesterification of carbethoxy groups being 8.8 grams. The resin was cooled and 40 grams of isophorone were added. This resin solution had a viscosity of 205 centipoises and contained 44.4 percent resin solids. It was used to coat glass cloth, aluminum and bonderized sheet steel. The dipped coatings cured to a hard flexible film at 200° C. which was not attacked by water and only slightly by toluene. The heat stability of the films was excellent, in fact, much better than could have been expected for a product this low in silicone content. Glass cloth coated specimens were aged at 250° C. and showed good retention of their high initial dielectric strength after ten (10) days at this temperature. In one test, the initial dielectric strength was 1200 volts per mil and dropped to only 1160 volts per mil after 10 days at 250° C.

Example XVII

Preparation of the sodium salt and free acid of beta-carboxyethylpolysiloxane by saponification and neutralization from beta-carbethoxyethyltriethoxysilane:

Beta-carbethoxyethyltriethoxysilane, in amount 50 grams, was placed within a 500 cubic centimeter round-bottomed flask fitted with a reflux condenser, and 10.5 grams of sodium hydroxide dissolved in 250 cubic centimeters of water was added thereto. The mixture was then refluxed for 72 hours. The ethanol was stripped off and the residue was dissolved in water. The material was then filtered to remove solid particles. The water solution was acidified with a ten percent hydrochloric acid solution to give the free acid. A gel was formed. The gel was filtered off and washed with water. The gel was then dried in a vacuum oven at 100° C. to yield a white solid which was identified as the desired free acid derivative.

Example XVIII

Preparation of a carbethoxy-modified silicone resin by cohydrolysis of gamma-carbethoxypropyltriethoxysilane, phenyltriethoxysilane and diphenyldiethoxysilane:

The following ethoxy silanes, in the amounts indicated, were dissolved in 100 milliliters of EtOH and charged into a one-liter, three-necked flask fitted with stirrer, thermometer, and dropping funnel:

EtOOC(CH$_2$)$_3$Si(OEt)$_3$: 79.2 grams (0.3 mole)
$\phi$Si(OEt)$_3$: 85.5 grams (0.3 mole)
$\phi_2$Si(OEt)$_2$: 110.4 grams (0.4 mole)

Water was added to the mixture dropwise from the funnel, in amount 27.0 grams (10% excess—1.5 moles), and the temperature rose from 18° C. to 21° C. Following the addition, heat was applied and a water condenser was put in place of the dropping funnel. The solution was refluxed for four (4) hours (80° C.). A clear light green solution was obtained upon cooling. A sample was taken of this carbethoxy-modified resin, stripped of solvent, and heated at 150° C. for 2 hours to yield a resin consisting of 99.8% solids. No gel formation occurred. ($n_D^{25°C}=$ 1.5353). An infrared spectrum showed residual Si—OH, CH(phenyl), CH$_3$CH$_2$—, COOC$_2$H$_5$, Si$\phi$, Si$\phi_2$ and Si—O—Si.

Example XIX

Preparation of beta - carbethoxyethylmethylsiloxane cyclic polymers by hydrolysis of beta-carbethoxyethylmethyldiethoxysilane:

Seventy grams (0.3 mole) of beta-carbethoxyethylmethyldiethoxysilane, 300 milliliters of diethyl ether and 25 milliliters of water were charged into a one-liter distillation flask fitted with a reflux condenser and magnetic stirrer. The mixture was stirred at room temperature for 90 hours. Water and ether were removed under reduced pressure to yield 49 grams (100% yield) of a clear water-white liquid. The hydrolyzate was charged to a "Hickman" molecular still and distilled under reduced pressure to yield the following three fractions:

(I) boiling point 70–80° C. (1.0–5.0) $n_D^{25°\,C.}$ 1.4379 (yield 13 grams);
(II) boiling point 90–110° C. 2.0–5.0) $n_D^{25°\,C.}$ 1.4438 (yield 8.0 grams); and
(III) boiling point 110–220° C. (2.0–5.0) $n_D^{25°\,C.}$ 1.4434 (yield 7.2 grams).

Fraction I was found upon analysis to be a mixture of cyclic trimer and tetramer, containing mostly trimer but also some residual Si—OH. The analytical data for this fraction are as follows:

|  | C | H | Si | OEt |
|---|---|---|---|---|
| Calculated | 45.0 | 7.5 | 17.5 | 28.1 |
| (C$_6$H$_{12}$SiO$_3$) | 41.3 | 7.9 | 18.7 | 25.2 |

Fractions II and III were found to be largely cyclic tetramer, containing some trimer and residual Si—OH.

What is claimed is:

1. A siloxane comprising units of the formula:

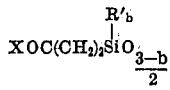

wherein X is Cl, ZHN— or MO—; W is R', a —NH$_2$ substituted monovalent hydrocarbon radical, or a —COOH substituted monovalent hydrocarbon radical; M is an alkali metal; R' is a monovalent hydrocarbon radical; and (b) has a value from 0 to 1 inclusive.

2. A siloxane amide as defined in claim 1 comprising units of the formula:

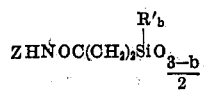

wherein Z is R', a —NH$_2$ substituted monovalent hydrocarbon radical, or a —COOH substituted hydrocarbon radical; R' is a monovalent hydrocarbon radical; and $b$ has a value from 0 to 1 inclusive.

3. A siloxane acid chloride as defined in claim 1 comprising units of the formula:

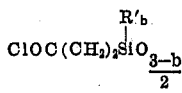

wherein R' is a monovalent hydrocarbon radical; and $b$ has a value from 0 to 1 inclusive.

4. A siloxane salt as defined in claim 1 comprising units having the formula:

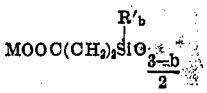

wherein M is an alkali metal, R' is a monovalent hydrocarbon radical, and $b$ has a value from 0 to 1 inclusive.

5. A siloxane consisting essentially of units as defined in claim 1 and units having the formula:

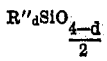

wherein $d$ has a value from 1 to 3 inclusive, and R" is a monovalent hydrocarbon radical.

6. A siloxane consisting essentially of units as defined in claim 2 and units having the formula:

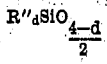

wherein $d$ has a value from 1 to 3 inclusive, and R" is a monovalent hydrocarbon radical.

7. A siloxane consisting essentially of units as defined in claim 3 and units having the formula:

$$R''_d SiO_{\frac{4-d}{2}}$$

wherein $d$ has a value from 1 to 3 inclusive, and $R''$ is a monovalent hydrocarbon radical.

8. A siloxane consisting essentially of units as defined in claim 4 and units having the formula:

$$R''_d SiO_{\frac{4-d}{2}}$$

wherein $d$ has a value from 1 to 3 inclusive, and $R''$ is a monovalent hydrocarbon radical.

9. A siloxane as defined in claim 1 having the unit formula:

$$ClOC(CH_2)_2 \overset{R'_b}{\underset{|}{Si}} O_{\frac{3-b}{2}}$$

wherein $R'$ is a monovalnet hydrocarbon radical; and $b$ has a value from 0 to 1 inclusive.

10. A siloxane as defined in claim 1 having the unit formula:

$$ZHNOC(CH_2)_2 \overset{R'_b}{\underset{|}{Si}} O_{\frac{3-b}{2}}$$

wherein Z is $R'$, a $-NH_2-$ substituted monovalent hydrocarbon radical, or a $-COOH$ substituted hydrocarbon radical; $R'$ is a monovalent hydrocarbon radical; and $b$ has a value from 0 to 1 inclusive.

11. A siloxane as defined in claim 1 having the unit formula:

$$MOOC(CH_2)_2 \overset{R'_b}{\underset{|}{Si}} O_{\frac{3-b}{2}}$$

wherein M is an alkali metal; $R'$ is a monovalent hydrocarbon radical; and $b$ has a value from 0 to 1 inclusive.

12. A siloxane as defined in claim 1 having silicon-bonded alkoxy groups.

References Cited

UNITED STATES PATENTS

| | | | |
|---|---|---|---|
| 2,855,381 | 10/1958 | Sommer | 260—46.5 E |
| 2,973,383 | 2/1961 | Black | 260—448.7 N |
| 3,143,524 | 8/1964 | Cooper et al. | 260—46.5 Y |
| 3,182,076 | 5/1965 | Holdstock | 260—448.2 B |
| 3,198,820 | 8/1965 | Pines et al. | 260—448.2 B |
| 3,227,579 | 1/1966 | Bluestein | 260—448.2 NX |
| 3,248,409 | 4/1966 | Bluestein | 260—448.2 BX |
| 3,265,623 | 8/1966 | Pines et al. | 260—448.2 NX |
| 3,338,943 | 8/1967 | Speier | 260—448.2 N |
| 3,493,533 | 2/1970 | Bailey et al. | 260—46.5 E |

TOBIAS E. LEVOW, Primary Examiner

P. F. SHAVER, Assistant Examiner

U.S. Cl. X.R.

106—15 R, 287 SB; 117—124 E, 124 F, 126 AB, 126 GR, 126 GS, 126 GN; 260—448.2 N, 448.8 R, 46.5 E, 46.5 Y, 825

PO-1050
(5/69)

UNITED STATES PATENT OFFICE
CERTIFICATE OF CORRECTION

Patent No. 3,629,309     Dated December 21, 1971

Inventor(s) D.L. Bailey & V. B. Jex

It is certified that error appears in the above-identified patent and that said Letters Patent are hereby corrected as shown below:

Column 18, line 31, "W is R' " should read --Z is R'--.

Signed and sealed this 1st day of October 1974.

(SEAL)
Attest:

McCOY M. GIBSON JR.
Attesting Officer

C. MARSHALL DANN
Commissioner of Patents